United States Patent [19]

LaBelle

[11] Patent Number: 4,545,405
[45] Date of Patent: Oct. 8, 1985

[54] MULTI-POSITION RELIEF VALVE

[75] Inventor: Charles E. LaBelle, Oostburg, Wis.

[73] Assignee: Thomas Industries, Inc., Louisville, Ky.

[21] Appl. No.: 550,299

[22] Filed: Nov. 9, 1983

[51] Int. Cl.⁴ ............................................. F16K 17/06
[52] U.S. Cl. .................................. 137/524; 137/540; 267/166
[58] Field of Search ................. 137/524, 540; 267/177

[56] References Cited

U.S. PATENT DOCUMENTS

| | | | |
|---|---|---|---|
| 1,288,821 | 12/1918 | Broderick | 137/524 X |
| 1,294,369 | 2/1919 | Banks | 137/524 X |
| 1,759,796 | 5/1930 | Miles | 137/524 X |
| 2,954,792 | 10/1960 | Hagger | 137/513.7 |
| 3,013,790 | 12/1961 | Anderson | 137/510 X |
| 3,451,421 | 6/1969 | Vicenzi | 137/505.42 X |

FOREIGN PATENT DOCUMENTS

| | | | |
|---|---|---|---|
| 823382 | 12/1951 | Fed. Rep. of Germany | 137/524 |
| Ad.59310 | 5/1954 | France | 137/524 |
| 533796 | 10/1976 | U.S.S.R. | 137/524 |

Primary Examiner—Robert G. Nilson
Attorney, Agent, or Firm—Emrich & Dithmar

[57] ABSTRACT

A multi-position pressure relief valve settable to operate at different pressure limits includes an adjustment rod, a valve bias spring and a valve member extending coaxially with one another, the axial spacing between the rod and the valve member determining the pressure limit for the valve. The rod carries a pin adapted to engage a stepped surface of a limit select member, the steps defining a plurality of stop positions for the rod, and each stop position corresponding to a different pressure limit setting. A control knob attached to the rod enables the rod to be manipulated to locate the pin in the stop position corresponding to the pressure limit desired.

9 Claims, 6 Drawing Figures

U.S. Patent        Oct. 8, 1985        4,545,405
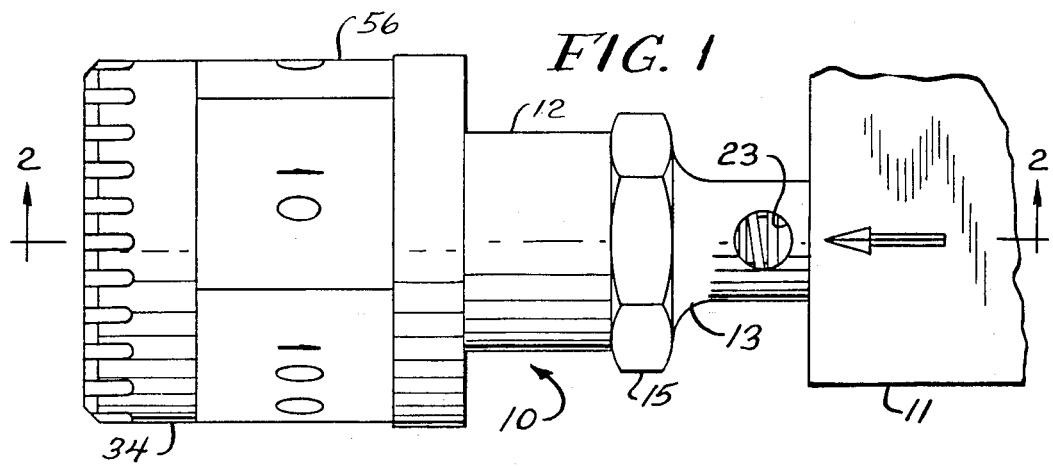
FIG. 1
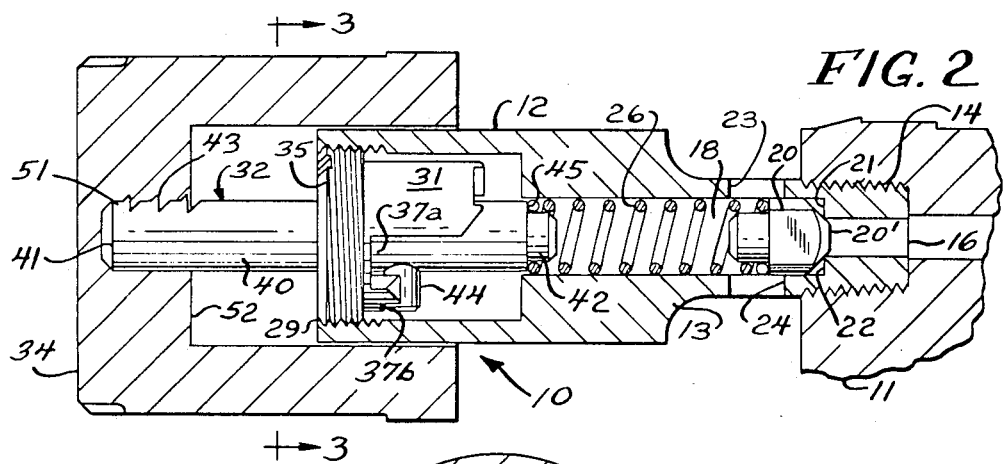
FIG. 2
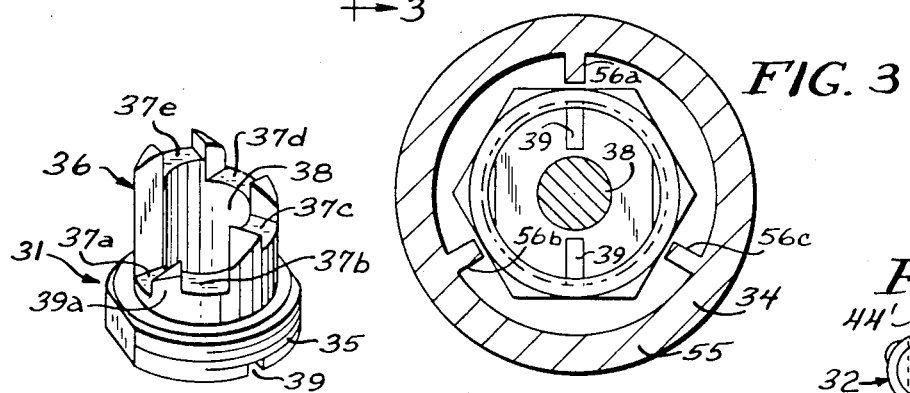
FIG. 3
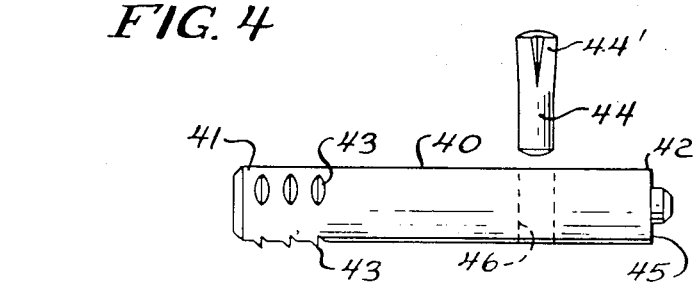
FIG. 4
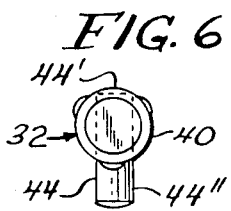
FIG. 6
FIG. 5

MULTI-POSITION RELIEF VALVE

BACKGROUND OF THE INVENTION

This invention relates to pressure relief valves and more particularly to a manually adjustable multi-position relief valve.

It is common practice to employ a pressure gauge, a pressure relief valve, or both in association with compressors, or other sources of fluid under pressure, to indicate over-pressure conditions and/or to allow for escape of pressurized fluid in case of an over-pressure condition. Pressure relief valves are generally designed to provide relief at a given pressure value. Some pressure relief valves provide adjustment, such as by turning an adjustment screw which is linked through a suitable mechanism to the valve closure mechanism which maintains the relief valve closed in the absence of pressure exceeding the preset limit. However, such arrangements provide only a small adjustment in the valve pressure limit, and adjustment of the pressure limit generally requires the use of a pressure gauge as a reference while the adjustment is being made to insure that the desired limit value is obtained.

It is apparent that different applications require different limit settings for pressure relief valves. For example, a relatively low limit in the order of 35 psi may be desirable for compressed air in a spray painting operation, whereas a higher limit, in the order of 50 to 75 psi, may be desired when filling a bicycle tire with air. Other applications may require higher or lower pressure limit settings. Thus, it would be desirable to have a pressure relief valve capable of adjustment over a wide range of pressure limits and which in use indicates the limit value without the requirement of a pressure gauge. Further, it would be desirable to have such pressure relief valve of this type which is easy to use and economical to manufacture.

SUMMARY OF THE INVENTION

The present invention provides a multi-position relief valve for use with a source of compressed fluid. The relief valve includes a body portion defining an inlet, an outlet, a passageway communicating the inlet with the outlet and a valve seat located within the passageway. A movable valve member cooperates with the valve seat under control of a bias means to maintain the valve member at a valve closing position to thereby maintain the inlet out of communication with the outlet. Additionally, limit select means is provided to control the bias means to establish a pressure limit value at which the valve member is moved from its valve closing position under the force of compressed fluid supplied to the inlet. The limit select means includes an adjustment member movable axially within the body portion to a plurality of discrete stop positions, and a limit select member which defines the stop positions. Each stop position defines and provides a different preselected or predetermined pressure limit for the relief valve.

In accordance with one embodiment of the invention, the limit select member has a surface which is stepped axially of th body portion, each step defining a different one of the stop positions. The adjustment member comprises a rod having a projection extending outwardly therefrom and adapted to engage a preselected one of the steps to locate the rod axially relative to the valve member. The bias means comprises a resilient member located between the rod and the valve member whereby the amount of compression of the resilient member is varied as a function of the axial separation of the rod and the valve member, and the position of the rod can be preselected to predetermine the pressure value for the pressure relief valve.

DESCRIPTION OF THE DRAWINGS

FIG. 1 is a side elevation view of the pressure relief valve provided by the present invention shown connected to a source of compressed fluid;

FIG. 2 is a sectional view of the relief valve taken along lines 2—2 of FIG. 1;

FIG. 3 is a sectional view of the relief valve taken along lines 3—3 of FIG. 2;

FIG. 4 is a perspective view of a limit select member of the pressure relief valve shown in FIG. 2;

FIG. 5 is an exploded side elevation view of an adjustment rod assembly of the relief valve shown in FIG. 2; and FIG. 6 is an end view of the adjustment screw assembly of FIG. 5 shown assembled.

DESCRIPTION OF THE PREFERRED EMBODIMENT

Referring now to FIGS. 1 and 2, the pressure relief or regulator valve 10 of the present invention is shown connected to a source 11 of a compressed fluid. The pressurized fluid source 11 may be, for example, the output of a compressor, the outlet of a fuel tank containing pressurized fluid, etc. The regulator valve 10 includes a generally cylindrical valve body portion 12 which may be made of machinable metal, such as brass. The valve body portion 12 has a reduced outer diameter at one end thereof defining a neck portion 13 which is provided with external threads 14 to facilitate connection of the valve to the compressed fluid source 11. A shoulder portion 15 of the valve body portion 12 defines a hex shaped collar for receiving a tool for tightening the relief valve during attachment of the valve to the compressed fluid source 11.

The valve body 12 had an inlet passage 16 which is communicable with a central bore 18 of the valve body through a valve which includes a valve member 20 axially movable within the central bore 18 and which cooperates with a valve seat 22 defined by inner edge 21 of the central bore of the valve body 12. As shown best in FIG. 2, the valve member 20, which for example, may be of stainless steel, has a frustoconical-shaped tip 20'. The mean diameter of the tip 20' corresponds to the diameter of the inlet passageway 16 so that in valve closing position, the surface of the tip 20' engages the valve seat 22. A bias spring 26 biases the valve member 20 to a valve closing position, in which it engages the valve seat. The helical valve-element-biasing spring 26 is contained within the central bore 18.

A pair of openings 23 and 24 formed in the neck 13 of the valve body 12 at diametrically opposed positions, define pressure relief outlet passageways. Whenever the pressure of the fluid provided by the source 11 exceeds the bias force of spring 26, the valve member 20 is driven off the valve seat 22, communicating the inlet passageway 16 with the outlet passageways 23 and 24 through the central bore 18 to vent the excessive pressure to the atmosphere.

The pressure relief valve 10 further includes a pressure limit adjust mechanism which includes a limit select member 31 (FIG. 4), an adjustment rod assembly 32, including a rod 40 and a pin 44, and an adjustment knob 34 which is attached to the rod at one end 41 thereof. Briefly, the limit select member 31, shown in perspective view in FIG. 4, defines a plurality of stop surfaces, in the form of grooves 37a-37e, which are engageable by the pin 44 carried by the rod 40. The rod 40 extends axially of the valve body with its end 42 engaging the bias spring 26, which is compressed between the rod 40 and the valve member 20. As will be shown, the limit adjust mechanism enables one to vary the axial spacing between the end of the rod and the valve member 20 with corresponding change in the amount of compression of spring 26 thereby changing the pressure limit for the relief valve.

Referring now to FIG. 4, the select member has a threaded base or collar portion 35 with a stepped wall portion 36 extending outwardly therefrom. The threaded base is adapted to be received by a threaded inner wall 29 of the valve body 12, as shown in FIG. 2. A pair of grooves 39 are formed in the bottom surface of the base to receive a tool to facilitate tightening of the select member 31 as it is assembled on the body 12 and to adjust the original pressure setting. The range select member 31 has an axial bore 38 through which extends the shaft of the adjustment rod 40 as shown in FIG. 2.

More specifically, the limit adjust member 31 (FIG. 4), is provided with a plurality of grooves 37, five in the present embodiment numbered 37a-37e. The bottom of the grooves 37a-37e, respectively, are located progressively further from the base of shoulder 35 of the member 31. Thus, the member 35 defines a stepped configuration along its circumference defining five stop surfaces, i.e., the bottoms of grooves 37a-37e at different elevations relative to the base 35. Upright portions, such as portion 39a between grooves 37a and 37b, define side walls for the grooves. The top of each upright portion is beveled defining a guide surface for guiding the pin 44 from a lower to the next higher groove. In view of its configuration, select member 31 is preferably casted from a metal to simplify its manufacture.

The rod 40 carries pin 44 which is adapted to engage a given one of these five grooves 37a-37e to establish of different one of five pressure limit values for the pressure relief valve 10. Referring now to FIG. 5, the rod 40 has an aperture 46 extending transverse of the axis of the rod 40 for receiving pin 44 which is grooved at one end 44'. When assembled, as illustrated in FIG. 6, the grooved end 44' of the pin 44 is flush with the surface of the rod 40 and the unflaired end 44" of the pin 44 extends outwardly from the side of the rod. The rod and pin may be made from steel.

With reference to FIG. 2, the pin 44 carried by the rod 40 is shown located in groove 37b, to define a first limit for the relief valve 10. The limit setting is changed by depressing the knob, moving the rod against the force of spring 26 to move the pin out of the groove it is in. The knob is then rotated, clockwise to decrease the limit setting or counterclockwise to increase the setting. Upon release of the knob, the rod is driven back under the force of the spring and the pin becomes located in the groove to which it is adjacent. The rod 40 can be manipulated to move the pin 44 to groove 32a to reduce the pressure limit for the relief valve 10, or, to locate the pin 44 in any of the other grooves 37c, 37d or 37e, each position establishing a different and progressively higher pressure limit for the relief valve 10. Stated in another way, as the pin 44 is moved progressively from groove 37a to 37b, 37c, etc., the free end of the rod 40 is located closer to the valve body 20. Thus, the axial spacing between the end of the rod and the valve member is varied, that is lessened in this case, causing a corresponding compression of the spring 26 located therebetween. This creates an increase in the compression on the spring with a corresponding increase in the force required to enable the valve to open.

Referring to FIG. 2, the end 41 of the rod 40 is received in an aperture 51 formed in the inner surface 52 of the base 54 of the knob 34. The rod 40 is provided with three sets of barbs 43, shown best in FIG. 6, near its end 41 at three points along its circumference, spaced 180 apart. The barbs 43 are embedded in the walls of the collar to secure the rod 40 and to the knob 34.

The operating knob 34 facilitates locating the rod in the grooves corresponding to the pressure limit desired. The knob 34, is of a rigid synthetic material, such as the one commercially available from Borg Warner under the trade name CYCOLAC XII. The knob has a thin side wall 55 which extends outwardly from the base. The inner surface of the knob has molded therein three reinforcing ribs 56a-56c, shown best in FIG. 4, extending axially of the knob. The ribs also define guide surfaces for the knob relative to the valve body. Although not normally in contact with the body 12, the ribs prevent excessive canting of the knob as it is operated.

The knob 34 has an indexing band 56, extending peripherally around its outer surface. The indexing band bears indicia identifying the five limit values of 10, 30, 50, 70 and 100 psi for the exemplary pressure relief valve 10. In use, the knob is depressed and then rotated until the desired limit indicia is aligned with an index mark on the compressor or source of fluid under pressure.

The end 42 of the rod 40 has a reduced outer diameter which defines a shoulder 45. The end 42 of the rod extends into the axial passageway 18 and locates the spring 26 with one end resting on the shoulder 45 and its other end resting on a shoulder defined by the reduced outer diameter on the valve member 20. This locates the valve member 20 in axially alignment with the rod 40. The positioning of the rod 32, and particularly the spacing between its end and the end of the valve determines the compression of the spring 26 and thus establishes the pressure limit for operating the valve to communicate the inlet passageway 16 to the relief ports 23 and 24.

With the pressure relief valve 10 connected to a source 11 of fluid under pressure, the pressurized fluid acts on the valve member 20. As long as the fluid pressure is less than the limit value established by the relief valve 10, the valve remains closed. However, if the fluid pressure exceeds the limit value, the valve member is driven off the valve seat, communicating the inlet passageway 16 with the outlet passages 23 and 24 through the central bore 18. The valve thus relieves the excess pressure and resets, allowing the pressure to again build up to the relief setting.

As illustrated in FIG. 1, by way of example, the pressure relief valve is set initially to a limit pressure of 30 psi. To decrease the pressure limit the the next lower value, 10 for the exemplary pressure relief valve, this is done by depressing the control knob 34, moving it towards the right in FIG. 1, and rotating the knob counterclockwise until the portion of the indexing band labeled "10" is aligned with the alignment mark on the valve body 12. This aligns the pin 44 with the groove 37A of the select member 31. Then, upon release of the knob 34, the rod 40 is driven outwardly of the valve body 12, towards the left in FIG. 1, until the pin 44 engages the bottom edge of the groove 37A which acts as a stop surface for the rod 40. This setting establishes the 10 psi pressure limit for the pressure relief valve.

The pressure limit setting can be increased from the initial setting of 30 to 50 psi in a similar manner, but the initial knob 34 is rotated clockwise after it has been depressed to align the indexing label bearing the legend "50" with the indexing mark on the valve body 12. This locates pin 44 adjacent to groove 37c and when the knob is released, pin 44 is driven into groove 37c.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. A multi-position relief valve for use with a dynamic source of compressed fluid, said relief valve comprising:
   a housing having a portion internally threaded and a body portion,
   said body portion defining an inlet, an outlet, a passageway communicating with said inlet said outlet and a valve seat located within the passageway;
   a valve member positioned in said housing and movable to a valve closing position where it cooperates with the valve seat to maintain the inlet out of communication with said outlet;
   bias means for establishing a force for biasing said valve member to said valve closing position; and
   limit select means including a limit select member and a rotatable adjustment member cooperating with said limit select member in controlling said bias means to establish a pressure limit value at which the valve member is movable from its valve closing position under the force of compressed fluid supplied to said inlet, said limit select member having external threads adapted to be received by said housing having a portion internally threaded to preset the multi-position relief valve, said rotatable adjustment member being movable to vary the biasing force of said bias means, said limit select member defining a plurality of discrete stop positions positioned about the circumference of said select member for engagement by said rotatable adjustment member, each stop position corresponding to a different preselected pressure limit for the relief valve; and
   means for indicating the pressure limit corresponding to the position of the rotatable adjustment member.

2. A multi-position relief valve according to claim 1 wherein said limit select member has a surface which is stepped axially of said body portion, each step defining a different one of said stop positions for said rotatable adjustment member, said adjustment member comprising a rod having a projection extending therefrom and adapted to engage a preselected one of said steps to locate the rod axially relative to said valve member and to retain said projection on said rod in said discrete stop position.

3. A multi-position relief valve according to claim 2 wherein each step of the limit select member is in the form of a groove.

4. A multi-position relief valve according to claim 2 wherein said bias means comprises a resilient member located between said rod and said valve member and compressed therebetween, whereby the amount of compression of the resilient means is varied in accordance with the axial spacing between the rod and the valve member.

5. A multi-position relief valve according to claim 4 wherein said limit select means includes a control knob secured to said rod, said means for indicating comprising limit value indicia carried by said knob.

6. A multi-position relief valve for use with a dynamic source of compressed fluid, said relief valve comprising: a housing having a portion internally threaded and a body portion, said body portion defining an inlet, an outlet, a passageway communicating with said inlet and said outlet, and a valve seat located within the passageway; a movable valve member positioned in said passageway and movable to a valve closing position where it cooperates with the valve seat to maintain the inlet out of communication with the outlet; bias means for biasing said valve member to said valve closing position; and limit select means including a limit select member and a rotatable adjustment member for controlling said bias means to establish a pressure limit value at which the valve member is movable from its valve closing position under the force of compressed fluid supplied to said inlet, said limit select member having external threads adapted to be received by said housing having a portion externally threaded to preset the multi-position relief valve, said rotatable adjustment member being movable coaxially with said valve member, said bias means including a resilient member located between said adjustment member and said valve member and compressed therebetween, said rotatable adjustment member being adapted to cooperate with said limit select member to locate said adjustment member at a selected one of a plurality of discrete preselected positions relative to said valve member to vary the axial spacing therebetween causing a corresponding change in the amount of compression of the resilient member whereby the force required to operate the valve is preselected as a function of the positioning of the rotatable adjustment member.

7. A multi-position relief valve according to claim 6 wherein said limit select member has a surface which is stepped in a direction which extends axially of said body portion, each step positioned about the circumference of said limit select member and defining a different one of said stop positions for said adjustment member, said rotatable adjustment member comprising a rod having a projection extending therefrom and adapted to engage a preselected one of said steps to locate the rod axially relative to said valve member.

8. A multi-position relief valve according to claim 7 wherein said limit adjust member is cylindrical in shape and includes a central bore through which extends a shank portion of the rod, the outer wall of the limit select member being stepped along its periphery defining said stop positions.

9. A multi-position relief valve according to claim 8 wherein each of said steps is in the form of a groove, with said bias means urging the projection of said rod into engagement with a bottom surface of the groove in which the projection is located.

* * * * *

UNITED STATES PATENT AND TRADEMARK OFFICE
CERTIFICATE OF CORRECTION

PATENT NO. : 4,545,405

DATED : October 8, 1985

INVENTOR(S) : Charles E. LaBelle

It is certified that error appears in the above-identified patent and that said Letters Patent is hereby corrected as shown below:

Column 1, line 62, delete "th" insert --the--;

Column 4, line 13, after "180" insert --°--;

Column 4, line 14, delete "and";

Column 4, line 60, delete the second "the".

Signed and Sealed this

Seventh Day of January 1986

[SEAL]

Attest:

DONALD J. QUIGG

Attesting Officer

Commissioner of Patents and Trademarks